United States Patent

[11] 3,577,628

| [72] | Inventor | Thomas Walter Bunyan |
| | | London, England |
| [21] | Appl. No. | 802,904 |
| [22] | Filed | Feb. 27, 1969 |
| [45] | Patented | May 4, 1971 |
| [73] | Assignee | P & O Pilgrim Valve Limited |
| | | London, England |
| [32] | Priority | Mar. 11, 1968 |
| [33] | | Great Britain |
| [31] | | 11,816/68 |

[54] MOUNTING OF PROPELLERS, IMPELLERS, WHEELS AND THE LIKE IN TORQUE AND THRUST TRANSMITTING CONNECTION ON SHAFTS
8 Claims, 1 Drawing Fig.

[52] U.S. Cl. ................................................ 29/471.1,
29/474.4, 29/475, 29/479, 29/483
[51] Int. Cl. ....................................................... B23k 31/02
[50] Field of Search ........................................... 29/471.1,
473.3, 474.3, 474.4, 475, 478, 479, 483

[56] References Cited
UNITED STATES PATENTS

| 2,200,162 | 5/1940 | Vulitch | 29/479 |
| 2,312,579 | 3/1943 | O'Brien | 29/474.4 |
| 2,844,042 | 7/1958 | Mercier | 29/471.1X |
| 3,025,596 | 3/1962 | Ward et al. | 29/471.1 |
| 3,286,341 | 11/1966 | Miller | 29/471.1 |
| 3,402,458 | 9/1968 | Asaff | 29/474.4X |

*Primary Examiner*—John F. Campbell
*Assistant Examiner*—Richard Bernard Lazarus
*Attorney*—Woodcock, Phelan, Washburn & Mackiewicz ABSTRACT: A method of mounting a propeller, impeller, wheel or the like on a shaft with a separate metallic externally tapered sleeve in torque and thrust transmitting connection on the shaft and force-fitted for torque and thrust transmitting connection in a correspondingly internally tapered hub of the member being mounted, in which a layer of a hardenable or cold-setting synthetic resin composition such as Araldite in liquid condition is introduced between the outer surface of the sleeve and the inner surface of the hub and the force-fitting pressure between the sleeve and hub maintained until the resin composition has set.

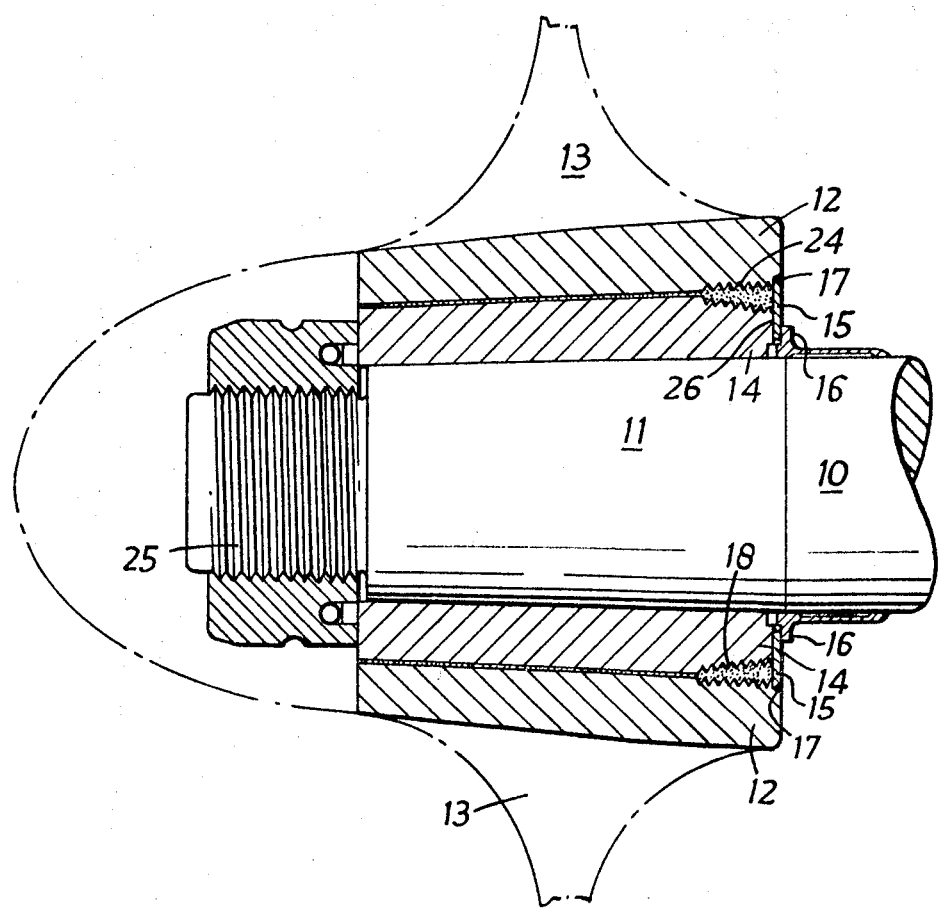

MOUNTING OF PROPELLERS, IMPELLERS, WHEELS AND THE LIKE IN TORQUE AND THRUST TRANSMITTING CONNECTION ON SHAFTS

The present invention relates to the mounting of propellers, impellers, wheels and the like of metal on shafts with torque and thrust transmitting connection therewith and more specifically to a mounted assembly which includes a separate metallic sleeve between the shaft and the hub of the member being mounted, the sleeve being externally tapered and force-fitted in the correspondingly internally tapered hub for torque and thrust transmission between the sleeve and hub and the combination of hub and force-fitted sleeve applied on the shaft with torque and thrust transmitting connection between the sleeve and the shaft.

The invention further relates to a method of producing such an assembly.

In the production of such assemblies concerned with the mounting of large and heavy components such for example as ships' propellers as hitherto practiced, highly accurate bedding of the tapered external surface of the sleeve with the tapered internal surface of the hub has been essential when force-fitting by drawing the sleeve into the hub. With a ship's propeller much time and skill, with much handwork, has been necessary in order to achieve good bedding contact of a minimum of 60 percent of the area of the surfaces, the tolerances on surface finish of the mating surfaces being of the order of 7 microns, and even such finishes are found to achieve at best an apparent coefficient of friction between the sleeve and hub of 0.185.

By means of the present invention achievement of a given force-fit of the sleeve in the hub in such an assembly is made possible without the need for the long preparatory high precision finishing operations upon the tapering surfaces to be mated and hitherto regarded as essential, and furthermore a much increased coefficient of friction is obtainable under similar force-fitting conditions as hitherto used, the increase sometimes being as much as seven-fold.

Because of the increase in the coefficient of friction between the sleeve and hub it is possible to increase and even double the thickness of the sleeve and this permits a considerable saving in the cost of the propeller since the cost of the material of the sleeve is a small fraction, e.g. one-eighth of that of bronze, normally used for propellers.

Furthermore, an effective torque and thrust transmitting force-fit of the sleeve in the hub may be obtained with a grip of the hub on the sleeve which is much less than that hitherto required, the reduction being in an inverse ratio to the increase in the coefficient of friction.

The reduction in the needed grip of the hub on the sleeve is of great advantage from the point of view of the effect of hub stresses on the fatigue performance of for example ships' propellers.

In accordance with the invention there is provided an assembly of a propeller, impeller or wheel on a shaft and including a separate externally-tapered metallic sleeve mounted in torque and thrust transmitting connection on the shaft and force-fitted for torque and thrust transmitting connection in a correspondingly internally-tapered hub of the member being mounted, characterized by the inclusion between the external surface of the sleeve and the internal surface of the hub of a layer of a hardenable or cold-setting synthetic resin composition.

The at present preferred synthetic resin composition is that known as Araldite which also exhibits good bonding properties when set, and having good shear resistance and high electrical insulating properties.

An example of an assembly according to the invention as applied to the mounting of a ship's propeller is shown in sectional side elevation in the accompanying drawing.

Referring to the drawing, 10 is a propeller shaft terminating in a coned part 11 and a threaded end portion 25.

The propeller comprises a hub 12 and a number of blades 13 cast integrally with the hub.

Between the coned part 11 of the shaft and the hub 12 is an externally and internally tapered metallic sleeve 14, the internal taper of which corresponds with the taper of the coned part 11 of the shaft and the interior of the hub 12 is tapered to correspond with the external taper of the sleeve 14.

To produce the assembly shown, the external surface of the sleeve 14 and the internal surface of the hub 12 are both coated with Araldite in liquid condition and the sleeve 14 introduced into the hub 12 and forced up with endwise pressure applied in any known manner, the endwise pressure being maintained until the Araldite has set into a layer in intimate contact with the surfaces of the sleeve and the hub.

For an assembly as shown the bore of the applied sleeve 14 is machined to match the coned part 11 of the shaft and the assembly of hub and sleeve applied over and forced up on the coned part of the shaft.

When the sleeve 14 is force-fitted to the coned end 11 of the shaft as described above, this involves some degree of expansion of the sleeve 14 with outward pressure on the hub 12 and a consequential advantage of a further increase in the coefficient of friction between the sleeve and hub.

The external taper of the sleeve 14 may be relieved at the forward end by the formation of circumferential grooves 24 in the surface thereof or alternatively or in addition circumferential grooves 18 in the internal surface of the hub 12 these grooves 24 and 18 being filled with Araldite, the purpose and effect of such relief being to provide a progressive reduction in the gripping or clamping stresses on the propeller shaft and gradual radial stress relief, with advantageous effect from the point of view of the fatigue strength of the shaft.

Where such stress relief grooves 24 and 18 are provided filling with Araldite may be effected by placing the preassembly of propeller and sleeve on its back, i.e. with the rear end downwards and pouring Araldite into the grooves and allowing it to set.

The Araldite, which has a Young's modulus of about one-twentieth of that of the material of the sleeve 14, imposes only a negligible restraint on the sleeve.

The forward end of the hub with sleeve assembly may be machined to provide an annular recess 26 as shown and a ring 15 of metal similar to that of the hub 12 introduced into the recess 26 and welded to the hub as shown at 17 to render the junction at the forward ends of the hub and sleeve watertight.

I claim:

1. A method of producing an assembly of a propeller, impeller, wheel or the like having an internally-tapered hub, in torque and thrust transmitting connection on a shaft, consisting in:
    applying a separate metallic sleeve externally tapered to correspond with the internal taper of the hub into the hub with a layer of a hardenable or cold-setting synthetic resin composition in liquid condition between the external surface of the sleeve and the internal surface of the hub:
    force-fitting the sleeve in the hub by application of endwise pressure and maintaining the endwise directed pressure until the synthetic resin composition has set:
    and applying the force-fitted combination of hub and sleeve in torque and thrust transmitting engagement with the shaft.

2. A method of producing an assembly of a propeller, impeller, wheel or the like having an internally-tapered hub, in torque and thrust connection on a shaft, consisting in:
    applying a separate metallic sleeve externally tapered to correspond with the internal taper of the hub, in torque and thrust transmitting engagement on the shaft:
    applying the internally-tapered hub over the mounted and externally-tapered sleeve with a layer of a hardenable or cold-setting synthetic resin composition in liquid condition between the external surface of the sleeve and the internal surface of the hub:
    force-fitting the hub on the sleeve by the application of endwise directed pressure and maintaining the endwise directed pressure until the synthetic resin composition has set.

3. A method as claimed in claim 1 wherein the synthetic resin composition is that known as Araldite.

4. A method as claimed in claim 1 of producing an assembly of a ship's propeller on the end of a propeller shaft consisting in:
   forming circumferential grooves in the internal surface of the hub or the external surface of the sleeve or in both said surfaces, at the forward end of the annular junction between said surfaces:
   and filling said circumferential grooves with the hardenable or cold-setting synthetic resin composition.

5. A method as claimed in claim 1 of producing an assembly of a ship's propeller on the end of a propeller shaft consisting in:
   forming an annular recess in the forward end of the force-fitted hub and sleeve and extending across the synthetic resin-filled junction between the hub and sleeve, and filling said recess with a ring of metal similar to that of the hub and welding said ring to said hub.

6. A method as claimed in claim 2 wherein the synthetic resin composition is that known as Araldite.

7. A method as claimed in claim 2 of producing an assembly of a ship's propeller on the end of a propeller shaft consisting in:
   forming circumferential grooves in the internal surface of the hub or the external surface of the sleeve or in both said surfaces, at the forward end of the annular junction between said surfaces:
   and filling said circumferential grooves with the hardenable or cold-setting synthetic resin composition.

8. A method as claimed in claim 2 of producing an assembly of a ship's propeller on the end of a propeller shaft consisting in:
   forming an annular recess in the forward end of the force-fitted hub and sleeve and extending across the synthetic resin-filled junction between the hub and sleeve, and filling said recess with a ring of metal similar to that of the hub and welding said ring to said hub.